Aug. 1, 1961 P. J. MORE 2,994,317
DOMESTIC COOKING APPLIANCE
Filed March 31, 1958 2 Sheets-Sheet 2

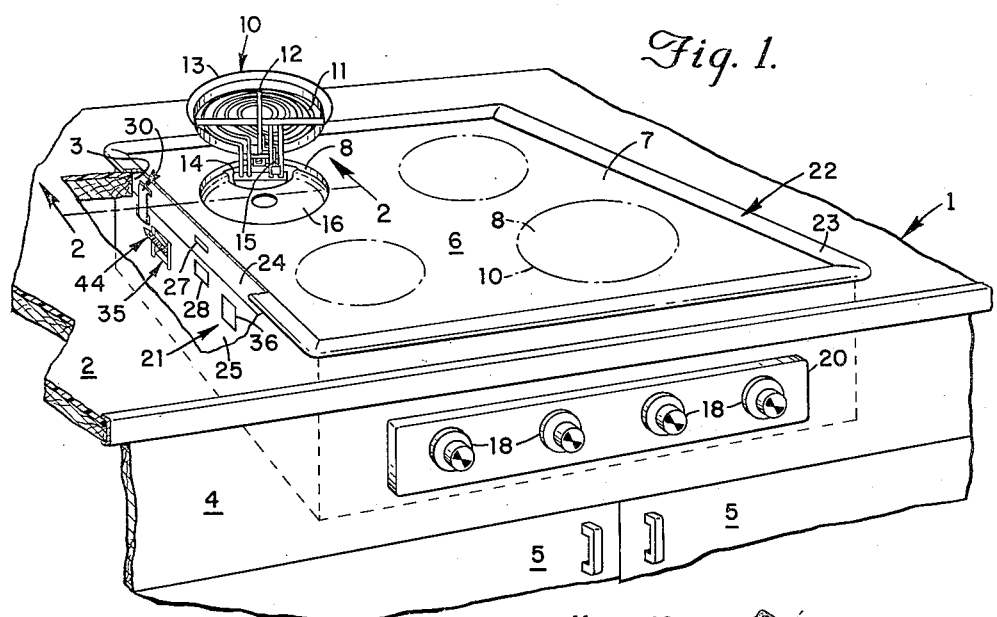
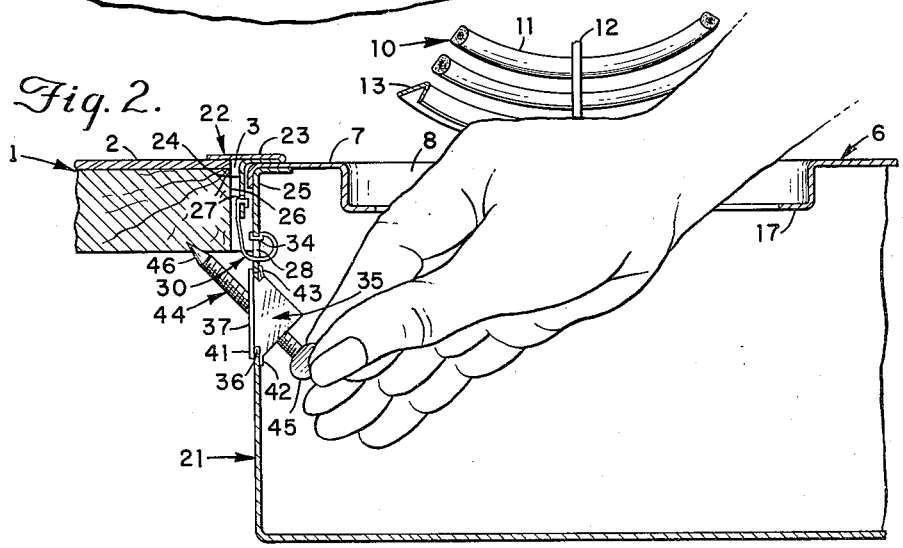
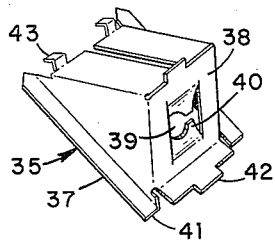
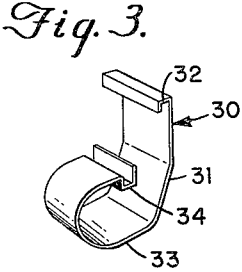
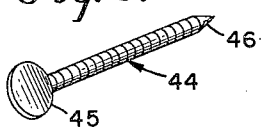

INVENTOR.
PHILIP J. MORE
BY
Andrew G. Hubbard
ATTORNEY

United States Patent Office
2,994,317
Patented Aug. 1, 1961

2,994,317
DOMESTIC COOKING APPLIANCE
Philip J. More, Evanston, Ill., assignor to General Electric Company, a corporation of New York
Filed Mar. 31, 1958, Ser. No. 725,079
4 Claims. (Cl. 126—211)

This invention relates to a domestic cooking appliance of the type adapted to be mounted on a kitchen counter or the like, and more particularly it relates to means for installing such an appliance in a counter.

A counter mounted appliance will be described herein in the form of an electrical surface cooking section appliance by way of example. This appliance is generally installed by dropping it into a suitable counter top opening provided by the builder to receive the cooking section rough-in box or body. As the appliance usually includes a top peripheral flange which may be provided by a mounting ring, the appliance may then be supported within the opening by means of the flange which will rest on the counter top adjacent the opening.

For securement purposes, the cooking section is generally provided with suitable, co-operating mounting brackets and screws. In a well known arrangement, the mounting screws are disposed wholly outside the rough-in box and below the cooking top in threaded engagement with brackets attached to the cooking section. On installation, after dropping the cooking section into the opening, the installer must enter the space below the counter top through the usual cupboard doors or the like in order to obtain access to the mounting screws. The installer then makes the screws up tight against lower portions of the counter top adjacent the opening, completing attachment of the cooking section to the counter.

As indicated, the attachment operation is relatively difficult because the installer, of necessity, must work in a cramped position in the confined space under the counter. As a consequence, considerable time and effort must be expended in order to complete an installation, resulting in relatively high installation costs.

Accordingly, it is an object of the present invention to provide improved installation means whereby a surface cooking section can be installed by dropping it into a prepared counter top opening and attaching it to the counter by manual operations conducted solely from above the counter top.

Another object of my invention is to provide improved fastening means for a counter mounted appliance having a depending body portion including mounting screws whereby the mounting screws are manually accessible from above the body portion and are engageable with the counter along a line-of-action adapted to prevent horizontal and vertical movement of the appliance relative to the counter.

It is another object of my invention to provide adjustable means for fastening a surface cooking section to any counter top having a thickness dimension within a relatively broad range, the means being manually operable from above the counter top.

Still another object of my invention is to provide a novel construction for a surface cooking section of the "flush mounted" type in which the cooking section can be preassembled so that it is prepared for dropping into a predetermined counter top opening and securement to the counter from above the counter top.

A further object of my invention is to provide a surface cooking section wall member with thread-groove engaging means inclined with respect to the wall member, whereby a toe fastening of the wall member to a backing member can be achieved by driving a screw in engagement with the means from above the cooking section into contact with the backing member.

It is further object of my invention to provide a novel nut member adapted to be inserted in and held by an apertured support, the nut member having thread-groove engaging means inclined relative to the support.

It is a further object of my invention to provide an improved fastener suitable for mounting in a wall of a counter appliance which is adapted to resiliently secure separate portions of the appliance into a unitary structure and also to provide a fastening screw mounting which projects the screw outwardly and upwardly at an angle relative to the wall.

A still further object of my invention is to furnish fastening means for a counter installed surface cooking section which provides positive securement, is simple to manufacture, low in cost, and operable solely from above the counter top, resulting in relatively low installation cost.

Briefly stated, in accord with the illustrated embodiments of my invention, I provide a novel counter appliance construction which is particularly advantageous for the installation of a surface cooking section in a kitchen counter. The cooking section includes a cooking top which is joined in covering relation to a rough-in box disposed within a suitable prepared opening in the counter-top. The side walls of the rough-in box are in relatively close spaced relation to the walls defining the counter top opening. The cooking top is provided with several relatively large openings covered by movable cooking devices. The cooking section may also be provided with a mounting ring having a generally T-shaped cross section with a top portion overlying the counter top and the outer edge of the cooking top, and a vertical portion extending between the wall of the counter top opening and the walls of the rough-in box. Resilient members secure the mounting ring to the joined rough-in box and cooking top so as to form a pre-assembled surface cooking section unit which is prepared for dropping into a counter opening. The side walls of the rough-in box are provided with a series of apertures having thread-groove engaging means inclined relative to the side walls. In a preferred embodiment, a thumbscrew is in engagement with the thread-groove engaging means of each aperture. The head of the thumbscrew is disposed within the rough-in box and its point extends out through the side wall aperture along a predetermined line-of-action which is inclined upward and outward relative to the side wall because of the inclination of the thread-groove engaging means. The thumbscrews are manually accessible from above the counter by moving the cooking devices so as to uncover the cooking top openings. On installation, the cooking section is placed over the prepared counter top opening and dropped into position with the mounting ring resting on the counter top. The cooking section is then fastened to the counter by uncovering the cooking top openings, reaching down into the rough-in box and tightening the thumbscrews into engagement with lower portions of the counter top adjacent the opening. When the screws are made tight, securement is complete because the predetermined angular direction of the screw points is adapted to hold the cooking top against horizontal and upward movement relative to the counter top, while downward movement is prevented because the mounting ring is supported by the counter top. The installation means provided permits cooking sections to be fastened to counter tops having thickness dimensions within a relatively broad range. A principal feature of the invention is that it permits a surface cooking section to be secured to a counter by a series of manual operations conducted solely from above the counter top.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

FIG. 1 is a perspective view of an electrical cooking section embodying the present invention, mounted on a kitchen counter top with one of the cooking units in its raised position, and portions of the counter top broken away to reveal underlying structure;

FIG. 2 is a fragmentary sectional view of the installed cooking section taken along the line 2—2 of FIG. 1, showing the accessibility to the interior thereof upon raising one of the cooking units;

FIG. 3 is a perspective view of a resilient clip member employed in pre-assembling the cooking section into a unitary structure;

FIG. 4 is a perspective view of a nut structure employed in securing the cooking section to the counter;

FIG. 5 is a perspective view of a thumbscrew used in securing the cooking section to the counter;

Figure 6:
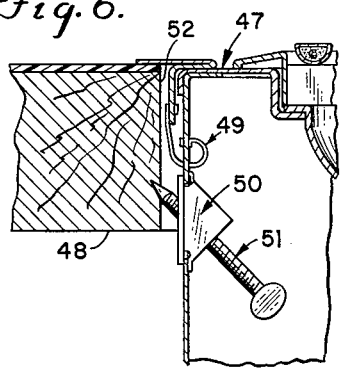
FIG. 6 is a fragmentary sectional view showing a surface section installed in a counter having a relatively thick counter top.

Referring now to FIGS. 1 and 2, in a conventional arrangement, a kitchen counter of the like 1 may include a counter top 2, preferably made from a rigid plastic laminate material suitably bonded to a plywood backing. The counter top may be provided with an opening 3 having a size and shape adapted to accommodate a cooking appliance as discussed more fully below. The counter front wall 4 may appropriately contain a series of cupboards 5 for storage. Mounted on the counter top is an electrical cooking appliance 6 of the "flush mounted" type. Said appliance comprises an enclosed box structure, of which the cover plate provides the actual cooking top 7. Said top has a suitable plurality of openings 8 to accommodate the cooking units 10 (for brevity only one opening and its associated cooking unit has been detailed). The cooking appliance is designated as "flush mounted" to indicate that the cover plate or cooking top 7 is installed substantially flush with the counter top. Each of the cooking units may be of the type disclosed in Vallorani et al., Patent Number 2,751,487, granted June 19, 1956, for "Spring Hinge for Range Surface Units" and assigned to my present assignee. Such cooking units, now well known in the art, comprise tubular sheath heating elements 11 arranged in flat spiral form on a spider 12 fixed to a trim ring 13 which rests upon the cooking top to maintain the cooking unit in operative position. The respective heating elements terminate in connection blocks 14 and the units are hinged so as to be movable to inoperative raised positions by the hinge 15 specifically disclosed in the said Vallorani et al. patent. Finally, each of the cooking units includes a reflector pan 16 which is removably carried by the flange 17 formed in the cooking top. It will be understood that some form of drip catcher (not shown) is usually placed below the reflector pan.

The cooking units are conected to an energy source (not shown) by an energizing circuit (not shown) which may include a plurality of suitable control switches 18, mounted in a panel 20.

Under the cooking top 7 is a rectangular, open-topped rough-in box 21 consisting of a sheet metal structure having flange means or equivalent for the securement of the box to the cooking top.

Enclosing the cooking top is a cooking appliance mounting ring 22 having a T-shaped cross-section and including a top flange portion 23 which overlies the cooking top and the counter top and a vertical portion 24 which extends down between the rough-in box side wall 25 and the adjacent wall 26 of the counter top opening. As the mounting ring is relatively small in transverse and vertical dimensions, and as it must bridge between the cooking top and the wall of the counter top opening, it is preferable that the top and the opening wall be in relatively close spaced relation. The vertical portion of the mounting ring has apertures 27 at spaced intervals while the side walls 25 of the rough-in box have apertures 28 in alignment therewith.

The surface cooking section appliance is preferably pre-assembled into a structure which can be readily dropped into a counter top opening on installation. Accordingly, I provide means to fasten the appliance and its associated mounting ring into a pre-assembled, unitary structure. The fastening means comprises a series of resilient spring steel clip members 30 of an approximate J-shape (See FIG. 3). Each of the clip members includes a body portion 31 having an upper, in-turned angle portion 32 with a depending flange. Extending inward from the body portion is a lower arcuate portion 33 terminating in a slotted portion 34 having an upwardly extending flange. On assembly, the angle portions 32 are hooked into the mounting ring apertures 27 and the arcuate portions are snapped into the rough-in box apertures 28. In order to illustrate this assembly, in FIG. 1, I have shown a pair of apertures 27 and 28 ready to receive a clip member 30 and also a clip member 30 after it is snapped into place in the apertures. As shown in FIG. 2, after the clip members are snapped into place, the upper edges of apertures 28 are grasped within the slotted portions 34. Thus the slotted portions 34 provide a detent means for the members 30. The spring steel material used in the clip members and their particular curved shape, results in a flexible, easily assembled fastening means which adjusts itself to dimensional variations and binds the joined parts into a compact unitary structure.

I provide means to fasten the appliance to the counter comprising, in a preferred form, a plurality of spring steel, sheet metal nuts 35 of an approximate triangular prism shape. Each of the nuts 35 is mounted on the side walls 25 of the rough-in box within one of a series of suitably spaced, rectangular mounting apertures 36 formed therein. By way of illustration, in FIG. 1, I have shown one of the apertures 36 with its associated nut removed for clarity. Each one of the nuts 35 has a rectangular open base, and two spaced parallel triangular side walls with outwardly extending base flanges 37 (see FIG. 4). The nut is provided with a rectangular wall 38 which is inclined at an angle relative to the base. The wall 38 has a central aperture 39, and includes resilient fingers 40, providing thread-groove engaging means, inclined at a predetermined angle relative to the base for reasons explained more fully hereinafter. The base flanges 37 have projecting ends 41, while the base of the wall 38 has a projecting lip 42. The nut is also provided with resilient fingers 43 extending from a rectangular wall adjacent the wall 38.

The nuts 35 may preferably be pre-assembled to the appliance rough-in box at the factory. On assembly, the nuts are inserted from the outside of the rough-in box, through the apertures 36 with the lip 42 extending below the aperture on the inside, and the adjacent ends 41 extending below the aperture outside the box. The nut is then rotated about the lower edge of the aperture 36 so as to force the resilient fingers 43 through the aperture, after which they snap out to an extended position above the aperture. It will be understood that the apertures 36 and the nut base flanges 37 are so proportioned that the flanges will not pass through the apertures. Accordingly, when the fingers 43 snap into their extended position, the nut will be fastened to the rough-in box side wall as best shown in FIG. 2, with the wall 25 grasped between the flanges 37 on the outside and lip 42 and the fingers 43 on the inside of the box.

I provide a plurality of mounting screws 44 to cooperate with the nuts 35 in fastening the appliance to the counter. The screws 44 are preferably of the thumbscrew type and each may be provided with a flat head 45 and a sharp point or end 46 as illustrated in FIG. 5. The thumbscrews are engaged with the nuts by inserting the points 46 into the respective nut apertures 39 and tightening from the inside of the rough-in box as shown in FIG. 2.

As shown (see FIGS. 1 and 2), the rough-in box apertures 36 are substantially closed by the assembly of the walled nuts 35 and the engagement of the thumbscrews 44. This is noteworthy because rough-in box apertures must be substantially closed as a prerequisite for listing of the appliance by Underwriters' Laboratories, Incorporated.

On the installation of the cooking appliance, downward movement of the cooking top relative to the counter top is not a problem because the appliance mounting ring is supported by the counter top as indicated above. However, the appliance fastening means must be adapted to prevent horizontal and upward movement relative to the counter top. Accordingly, I provide means comprising the nuts 35 to direct the mounting screws along a predetermined angular line of action whereby the force exerted by the screws against the counter is the resultant of an outwardly directed horizontal force and an upwardly directed vertical force. Specifically, in the illustrated embodiment, the thread-groove engaging means provided by the nuts projects the mounting screws outward and upward from the rough-in box at a predetermined angle inclined approximately 45° from either a horizontal or a vertical axis through the appliance. This preferred line of action for the mounting screws has provided excellent results in securing the present appliance against movement relative to the counter top. However, it has been determined experimentally that similarly mounted screws directed along a line of action at any angle in the range between 30° and 60° relative to a horizontal axis through a counter mounted appliance may provide acceptable fastening results.

The operation of my invention will best be understood by describing its use in the installation of the surface cooking section appliance illustrated in FIGS. 1 and 2. It will be understood that the appliance is pre-assembled on its arrival at the installation site with the clip members 30 fastening the appliance and its mounting ring into a unitary structure and the nuts 35 mounted on the rough-in box side walls with the thumbscrews 44 preferably in engagement with the nuts in a partially tightened condition. The arrangement described is particularly advantageous, for the cooking appliance may then be readily dropped into position in the counter top opening 3 where it will be self supporting because of the mounting ring 22 overlying the counter.

In order to carry out securement of the appliance after making lateral adjustments directed at centering the appliance over the opening and squaring it with respect to the front of the counter, the installer must tighten the mounting screws which are readily accessible from above the counter top through the cooking top openings 8. The installer uncovers the openings and obtains access to the screws merely by raising a cooking unit 10, lifting out the reflector pan 16, and reaching his hand down into the interior of the rough-in box as shown in FIG. 2. He then grasps the thumbscrew head 45 between his thumb and forefinger and tightens the thumbscrew point 46 into engagement with a lower portion of the counter top adjacent the opening. He then proceeds around the inner periphery of the rough-in box 21, uncovering the openings 8 as required and tightening the respective thumbscrews into engagement with the counter. During the tightening operation, the installer carries out any further lateral adjustment of the appliance that is required, loosening and tightening appropriate thumbscrews to obtain the precise desired position of the appliance. It will be noted that the installer may observe the periphery of the cooking appliance, and its disposition relative to the counter top during the entire tightening operation. Accordingly, the accessibility of the thumbscrews from above the counter top and their angular relationship makes it possible to adjust the cooking appliance laterally with particular facility and accuracy. As the counter top backing is generally of a relatively soft wood, on tightening of the thumbscrews, their points will readily dig into the wood backing, clamping the counter top 2 between the mounting ring 22 and the thumbscrews 44 and snugly seating the mounting ring on the counter top. We thus have provided means to carry out a "toe" fastening of the walls of the rough-in box to a backing member consisting of the counter top. As discussed more fully above, the outward and upward line-of-action of the engaged thumbscrews positively secures the cooking appliance against horizontal and vertical movement relative to the counter top, completing the installation of the appliance. Accordingly, there is no need for the installer to open the cupboard doors under the counter top and to enter the confined space thereunder in order to carry out any of the installation operations. Thus, it will be readily understood that I have provided an improved installation means for a kitchen counter mounted cooking appliance whereby it can be dropped into a prepared counter top opening and attached to the counter by manual operations conducted solely from above the counter top.

One of the features of the present invention is that it provides adjustable fastening means whereby appliances can be readily secured to conter tops having a considerable variation in thickness. With the preferred embodiments illustrated in which the length of the mounting screw is approximately 2 inches, a cooking appliance can be positively secured to any counter top measuring three-eighths of an inch or more in thickness. This thickness range covers substantially all counter tops used to support a counter mounted appliance. If the counter top is relatively thin, for example, between three-eighths of an inch and 1⅜ inches in thickness, the points of the thumbscrews will engage the horizontally extending lower surface of the counter top as shown in FIG. 2. However, if the counter top is more than 1⅜ inches thick, the points of the screws will engage the wall of the counter top opening rather than the lower surface of the counter top. The securement of a surface cooking appliance 47 to a relatively thick counter top 48 using the present invention is illustrated in FIG. 6. A plurality of clip members 49 are used to fasten the appliance and its mounting ring into a unitary structure. The appliance rough-in box includes a plurality of suitably spaced sheet metal nuts 50 mounted on its side walls. It will be noted that the points of the mounting thumbscrews 51 are in engagement with the vertically extending, counter top opening wall 52. It will be understood that the thumbscrews 51 are tightened and directed along an angular line-of-action in accord with the thumbscrews 44 shown in FIGS. 1 and 2.

Figure 7:
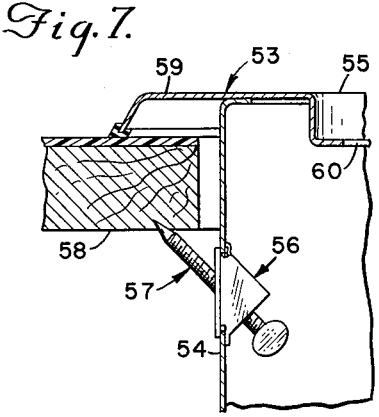
FIG. 7 is a fragmentary sectional view showing a counter fastening arrangement for a surface cooking section of the type in which the cooking top is raised above the counter and overlies a portion of the counter top adjacent the opening.

My invention is not limited to cooking sections of the "flush-mounted" type which includes a mounting ring as shown in FIGS. 1 and 2. In fact, it is also advantageous for the installation of surface cooking section appliances of the type in which the plane of the cover plate or cooking top is above the counter top and overlies the counter top adjacent the opening. This latter type of surface cooking section 53 is illustrated in FIG. 7. It includes a depending rough-in box 54 and suitably attached cooking top 55. The rough-in box includes a plurality of suitably spaced nuts 56 mounted on its sidewalls. As shown, mounting thumbscrews 57 are in engagement with the lower surface of the counter top 58, clamping the counter top between an outer peripheral flange 59 on the cooking top 55 and the mounting thumbscrews 57. The thumbscrews 57 are tightened along an angular line-of-action by reaching down through suitable openings 60 in the cooking top after raising the cooking unit (not shown) and removing the reflector pan (not shown) as described in connection with the appliance shown in FIGS. 1 and 2. It will be noted that with this type of appliance, as there is no mounting ring used, there is no need for resilient clip members to secure the rough-in box to a mounting ring.

Figure 8:
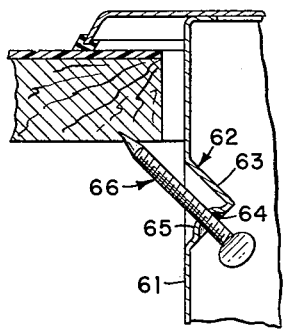
FIG. 8 is a fragmentary sectional view of a surface cooking section illustrating a wall construction forming part of a modified fastening arrangement.

While my preferred appliance construction includes a nut which is mountable in a side wall opening in the rough-in box, the benefits of my invention can also be achieved by fabricating an integral nut structure into the side walls of the rough-in box. The side walls can be suitably embossed and then provided with perforations including thread-groove engaging means to hold and direct the screw. This type of construction is advantageous in that it eliminates a separate nut part and the need for assembling it into the rough-in box. The construction described is illustrated in FIG. 8 in which a counter mounted appliance rough-in box side wall 61 contains an integral nut structure 62 comprising an embossed portion 63 which is provided with an opening 64 which includes fingers 65 forming suitable inclined thread-groove engaging means. The thumbscrews 66 are tightened from above the counter top and co-operate with the nut structure 62 shown in FIG. 8 in the same fashion as the thumbscrews in FIGS. 1 and 2.

Figure 9:
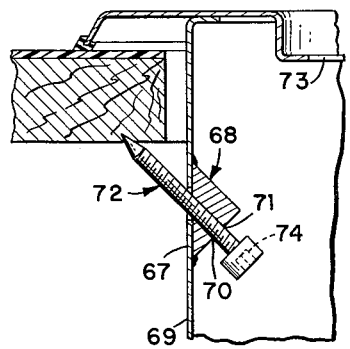
FIG. 9 is a fragmentary sectional view of a surface cooking section including another fastening arrangement modification.

Referring now to FIG. 9, I have shown therein another modification of my surface cooking section fastening means. A surface cooking section rough-in box 67 has a series of solid nut structures 68 mounted on its side walls 69 by any suitable method, as for example, by welding. Each of the nut structures is bored with a hole 70, inclined relative to the walls 69, which is provided with thread-groove engaging means 71 consisting of internal screw threads. While I prefer to use a mounting screw of the thumbscrew type shown in FIG. 5, the invention is not limited thereto. As illustrated in FIG. 9, a mounting screw 72 of the socket head type may be readily substituted for the thumbscrew of my preferred embodiment. The socket head screw 72 shown in FIG. 9 can be tightened by reaching down through a suitable cooking top opening 73 (the cooking unit and reflector pan are not shown) in the manner described previously, and inserting an appropriate wrench (not shown) into the socket 74 in the head of the screw, and tightening the screw into engagement with the counter top. Here again the mounting screw line-of-action is similar to that of the thumbscrews of FIGS. 1 and 2.

Figure 11:
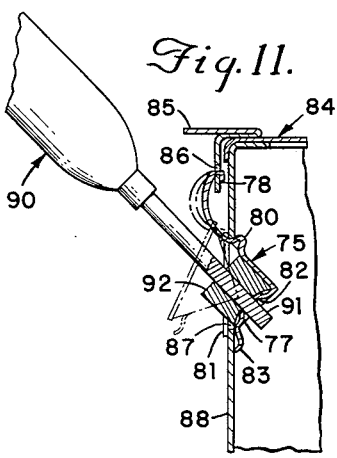
FIG. 11 is a fragmentary sectional view of a surface cooking section appliance provided with fastening means comprising the combination mounting clip and nut fastener structure of FIG. 10; the view illustrates the use of the fastener in the pre-assembly of the appliance and its mounting ring.
Figure 10:
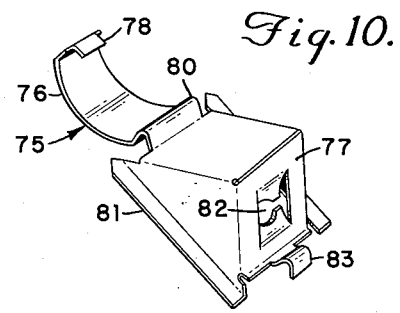
FIG. 10 is a perspective view of a combination mounting clip and nut fastener structure.

While I prefer to fabricate the nuts and the resilient clip members of my invention as separate parts inasmuch as a clip member is not always required (see FIG. 7), it will be understood that the nuts and the resilient clip members can be combined into a single fastener part if desired. Accordingly, a combination mounting clip and nut fastener 75 is illustrated in FIGS. 10 and 11. The combination clip and nut fastener 75 is preferably fabricated from spring steel sheet metal. The structure 75 includes a clip portion 76 and a lower nut portion 77. The clip portion 76 includes a tongue 78 and a lower portion which is curved upward to form a hook 80. As illustrated, the lower nut portion 77 includes flanges 81 extending outward to form a base, and a wall with a central aperture 82 provided with thread-groove engaging means inclined relative to the base. A resilient finger 83 curves outward from the apertured wall.

In FIG. 11, I have illustrated the combination mounting clip and nut fastener 75 of FIG. 10 as it is used in the preassembly of an appliance 84 and its mounting ring 85 into a unitary structure. It will be understood that a plurality of fasteners 75 are suitably spaced around the appliance periphery in order to complete the pre-assembly. On the assembly of an individual fastener 75, its tongue 78 is hooked into one of a series of openings 86 in the vertical portion of the mounting ring which are in alignment with a series of suitable apertures 87 in the appliance rough-box 88. The fastener 75 then depends from the mounting ring in the position shown in broken lines in FIG. 11. Next, a hand tool 90 is engaged with the fastener by inserting a tool end 91 through fastener aperture 82 and placing a plug portion 92 of the tool 90 in contact with the inside of the apertured fastener wall. The tool is then used to rotate the apex of the nut portion 77 into the rough-in box aperture 88 until the finger 83 snaps over the lower edge of aperture 88 into the rough-in box. Next, the tool 90 is pivoted inward about the fastener edge containing finger 83, forcing the hook 80 past the upper edge of aperture 87, into the rough-in box. The fastener 75 and the tool 90 are then in the position shown in solid line in FIG. 11 with the wall of the rough-in box grasped between the flanges 81 on the outside, and hook 80 and finger 83 on the inside of the box. When the tool 90 is removed, the assembly of fastener 75 will thus be complete. The shape of the clip portion 76 and its spring material co-operate to provide a resilient structure which adjusts itself to dimensional variations and provides an effective clamping means. Accordingly, after the remaining fasteners are assembled as described, the appliance 84 and its mounting ring 85 will be positively fastened into a unitary structure. It will be understood that the appliance 84 can be installed in a kitchen counter by engaging suitable mounting screws (not shown) with the inclined thread-groove engaging means of nut portion 77, and tightening the screws against a counter top (not shown) as described hereinbefore.

Although my invention has been described herein in conjunction with an electrical surface cooking section appliance, it can be readily seen that the teachings of my invention are equally applicable to other counter mounted appliances, and in particular, to gas surface cooking sections.

While there has been described what is at present considered to be the preferred embodiments of the invention, it will be understood that various modifications may be made therein, and it is intended to cover in the appended claims all such modifications as fall within the scope of the invention.

I claim:

1. A cooking top assembly arranged for mounting in an opening provided therefor in a counter or the like, comprising a box structure, a cover plate secured thereto, said cover plate having openings adjacent the side walls of said structure, said openings being large enough to permit the passage into said box structure of the hand and wrist of an adult person, a mounting strip having a top portion horizontally overlying the margins of the cover plate and extending laterally outward thereof, means including a plurality of resilient elements releasably securing said mounting strip to the side walls of said box structure, means in the side walls of said box structure providing a plurality of female screw threads the operating plane of which is in an angular relation to said side walls, said screw-threads being within said box structure and in mutually spaced relation in a plane parallel to the bottom of said structure, a screw in each of said screw threads extending in an upward and outward direction relative to said side walls a distance sufficient to engage the under or side portion of a counter, said screws having head portions disposed within said structure and being accessible through said cover plate openings for manual rotation of said screws along an axis extending in an upward and outward direction relative to said side walls, the ends of said screws being adapted to engage and penetrate an adjacent supporting counter structure thereby producing lateral and vertical components of force whereby the manipulation of said screws may effect the desired lateral adjustment of said cooking top assembly while exerting a downward effort on said box structure, and a heating element removably disposed in each said cover plate opening.

2. A cooking top assembly according to claim 1, in which the resilient elements for securing said mounting strip are integral with the screw-thread providing means.

3. A cooking top assembly arranged for mounting in an opening provided therefor in a counter or the like, comprising a box structure including a cover plate having flange means extending outward laterally beyond the side walls of said box structure, said cover plate having openings adjacent the side walls of said structure, said openings being large enough to permit the passage into said box structure of the hand and wrist of an adult person, means on said box structure providing a plurality of female screw threads in fixed relation to the side walls thereof, the operating plane of said screw threads being in an angular relation to said side walls, said screw-thread providing means disposing the screw-thread portions thereof within said box structure and in mutually spaced relation in a plane parallel to the bottom of said structure, a screw in each of said screw threads extending in an upward and outward direction relative to said side walls with its upper end extending outwardly of the side walls a distance sufficient to engage the under or side portion of a counter, said screws having head portions disposed within said structure and being accessible through said cover plate openings for manual rotation of said screws along an axis extending in an upward and outward direction relative to said side walls, the ends of said screws being adapted to engage and penetrate an adjacent supporting counter structure thereby producing lateral and vertical components of force whereby the manipulation of said screws may effect the desired lateral adjustment of said cooking top assembly while exerting a downward effort on said box structure, and a heating element removably disposed in each said cover plate opening.

4. A cooking top assembly according to claim 3, in which said screw-thread providing means are integral with the side walls of said box structure.

References Cited in the file of this patent

UNITED STATES PATENTS

| | | |
|---|---|---|
| 1,165,769 | Fehrer | Dec. 28, 1915 |
| 1,882,306 | Tinnerman | Oct. 11, 1932 |
| 2,551,759 | Pence | May 8, 1951 |
| 2,625,288 | Clark et al. | Jan. 13, 1953 |
| 2,628,365 | Drain | Feb. 17, 1953 |
| 2,719,558 | Tinnerman | Oct. 4, 1955 |
| 2,762,061 | Ball | Sept. 11, 1956 |
| 2,810,057 | Nolan | Oct. 15, 1957 |
| 2,812,521 | Skinner | Nov. 12, 1957 |
| 2,831,955 | Sheidler | Apr. 22, 1958 |
| 2,836,216 | Rapata | May 27, 1958 |
| 2,868,604 | Gibson et al. | Jan. 13, 1959 |
| 2,887,103 | Reeves | May 19, 1959 |